April 16, 1968  G. E. GORKER  3,378,453

HIGH HEAT FLUX NEUTRONIC FUEL ELEMENT

Filed July 13, 1966  3 Sheets-Sheet 1

INVENTOR.
George E. Gorker
BY
ATTORNEY.

INVENTOR.
George E. Gorker
BY
ATTORNEY.

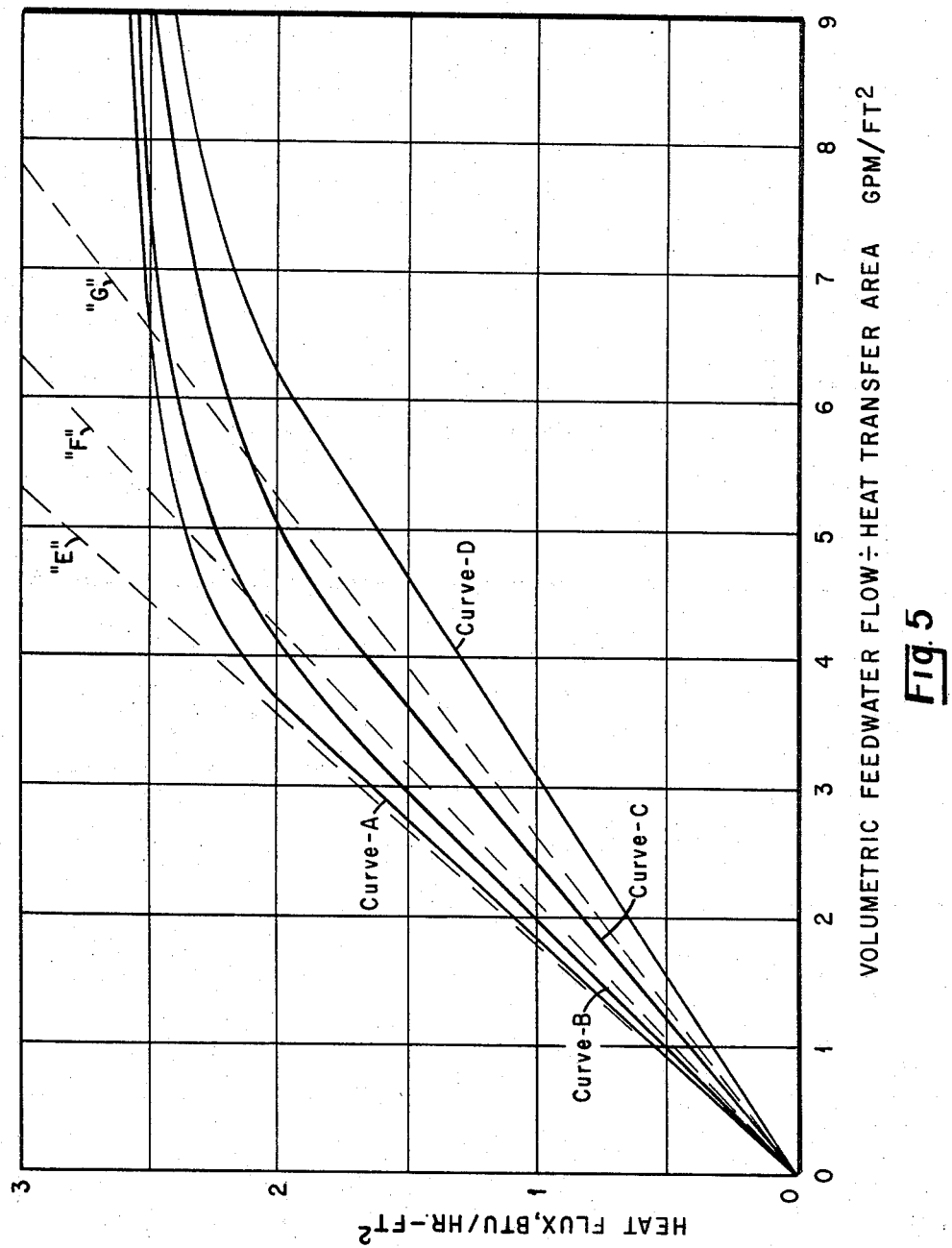

3,378,453
HIGH HEAT FLUX NEUTRONIC
FUEL ELEMENT
George E. Gorker, Cincinnati, Ohio, assignor to the United
States of America as represented by the United States
Atomic Energy Commission
Filed July 13, 1966, Ser. No. 565,012
6 Claims. (Cl. 176—43)

ABSTRACT OF THE DISCLOSURE

A fuel element for a boiling water neutronic reactor. Fissionable fuel is disposed about a cylindrical coolant channel containing an elongated insert centrally disposed along the length of the channel. The central insert comprises a helical rib fixed to and spiraling about a central shank. The helical rib is spaced apart from the coolant channel wall along that portion of the channel surrounded by fissionable fuel. Means are provided for imparting an initial vortex flow to liquid coolant entering the coolant channel. The liquid coolant is maintained in vortex flow along the remaining length of the coolant channel by the action of vaporized coolant generated in the coolant channel as it flows along a spiral path defined by the helical rib and shank portion of the central insert.

---

The invention described herein was made in the course of, or under, a contract with the U.S. Atomic Energy Commission. It relates generally to neutronic fuel elements and more specifically to high heat flux neutronic fuel elements for boiling water reactors.

A long-existing problem associated with boiling-water neutronic reactor systems has been that of achieving high power densities in the reactor core without encountering "burnout" conditions. Burnout occurs in a boiling water reactor when a maximum heat flux (burnout heat flux) is exceeded under nucleate boiling conditions and the density of the vapor bubbles becomes so great that they coalesce and form a vapor film over the heat transfer surface. When this happens, film boiling occurs with a resultant sharp drop in heat transfer between the heat transfer surface (fuel element cladding) and the water. Since reactor fuel elements provide a constant heat output, their operation under film boiling conditions, with reduced heat transfer, results in a great increase in their operating temperature. Such an increase in temperature usually results in the melting of the fuel element cladding with a subsequent release of fission products and the creation of a hazardous condition. A more detailed discussion of heat transfer to boiling liquids and the "burnout" problem can be found on pages 379–387 of Nuclear Reactor Engineering by Glasstone and Sesonske, 1963 Edition.

The burnout problem, as discussed above, has provided a barrier to the utilization of the otherwise virtually unlimited power generating capacity of boiling water reactors. To increase the power output from such reactors, it is necessary to increase their burnout heat fluxes as only a limited amount of heat transfer surface is available therein and cannot be readily increased.

Although it is well known that burnout heat flux can be increased by increasing the axial rate of fluid flow past the heat transfer surface, this technique is severely limited because the pumping power required to increase the flow rate increases exponentially with the increase in burnout heat flux achieved thereby. Furthermore, such increases in burnout heat flux have generally been restricted to non-boiling or surface boiling systems where no useful steam is produced.

It is also well known that an improvement in burnout heat flux results when spinning flow is provided. As shown in U.S. Patent No. 2,950,604 of common assignee, practical improvements over axial flow at equal pumping powers have been found where rotational velocities are achieved sufficient to produce centrifugal acceleration at the heat transfer surface of at least 10,000 g. The teachings of that patent also relate to non-boiling or surface boiling systems where no useful steam is produced; and although some improvements are noted at high rotational velocities over axial flow systems using equal pumping power, this technique is also limited by exponential increases in pumping power with increasing burnout heat fluxes.

The invention described in U.S. Patent No. 3,339,631 of common assignee provides high burnout heat fluxes while requiring only very low pumping powers. In that case the generated steam is utilized to drive the unevaporated water in vortex flow. Lower burnout heat fluxes existed near the inlet area of the heat exchange tubes in that invention, however, due to the lack of any initial driving steam flow at the inlet of the heat exchange tube. That problem was solved by using a tapered core insert to mechanically induce vortex flow in the incoming feedwater. Such a tapered core is difficult and expensive to produce due to the varying size of the helical rib which spirals about the central shank portion. An uneven heat transfer rate was also found in the tube wall where it contacted the helical rib which extended from the shank portion to the tube wall. Such uneven heat transfer induces thermal stresses in the heat exchange tube due to the corresponding uneven temperature of the wall.

It is, accordingly, a general object of the invention to provide a fuel element for a boiling water neutronic reactor characterized by large burnout heat fluxes.

Another object is to provide a fuel element for a boiling water neutronic reactor characterized by large burnout heat fluxes and a relatively uniform heat transfer rate along its length.

Still another object of the invention is to provide a fuel element for a boiling water neutronic reactor characterized by large burnout heat fluxes and a low pressure drop between its inlet and outlet ends.

Other objects of the invention will become apparent from an examination of the following description of the invention and the appended drawings wherein:

FIG. 5 is a graph showing typical experimental results at various operating pressures using coolant channel inserts in accordance with the present invention.

In accordance with the invention, a fuel element for a boiling water neutronic reactor is provided. The fuel element contains a cylindrical coolant channel with an elongated insert centrally disposed along the length of the channel. The central insert comprises a helical rib fixed to and spiraling around a central shank portion. The radial periphery of the helical rib is spaced apart from the wall of the coolant channel along that portion of the channel surrounded by heat generating fuel. Means are provided for imparting an initial vortex flow to liquid coolant entering the coolant channel. The liquid coolant is maintained in vortex flow along the remaining length of the coolant channel by the action of vaporized coolant generated in the coolant channel as it seeks the center of the coolant channel and flows at high velocity along a spiral path defined by the helical rib and shank portion of the central insert.

Figures 1, 2:
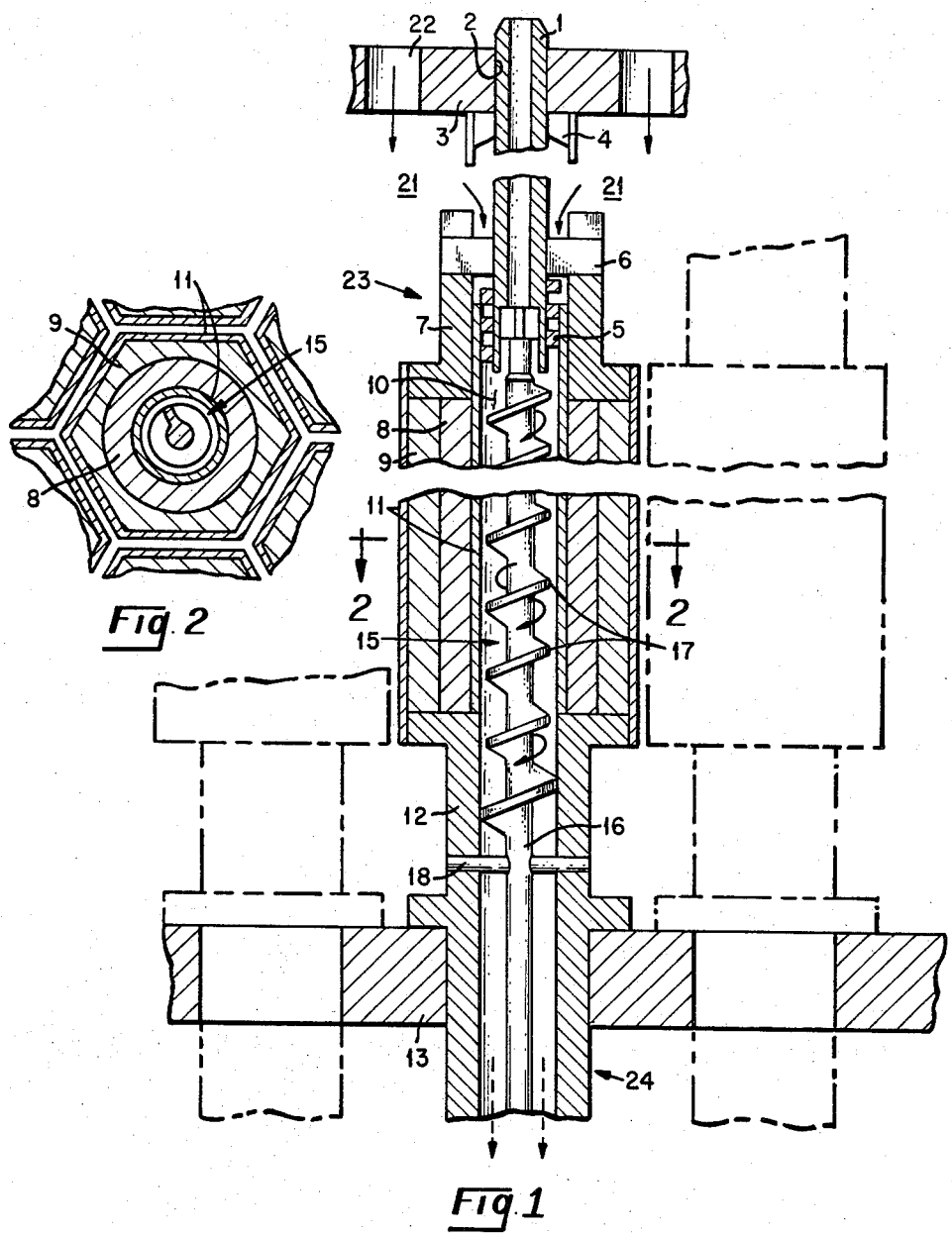
FIG. 1 is a vertical sectional view of a neutronic reactor fuel element embodiment constructed in accordance with the present invention.
FIG. 2 is a transverse sectional view of the fuel element of FIG. 1.
Figures 3, 4:
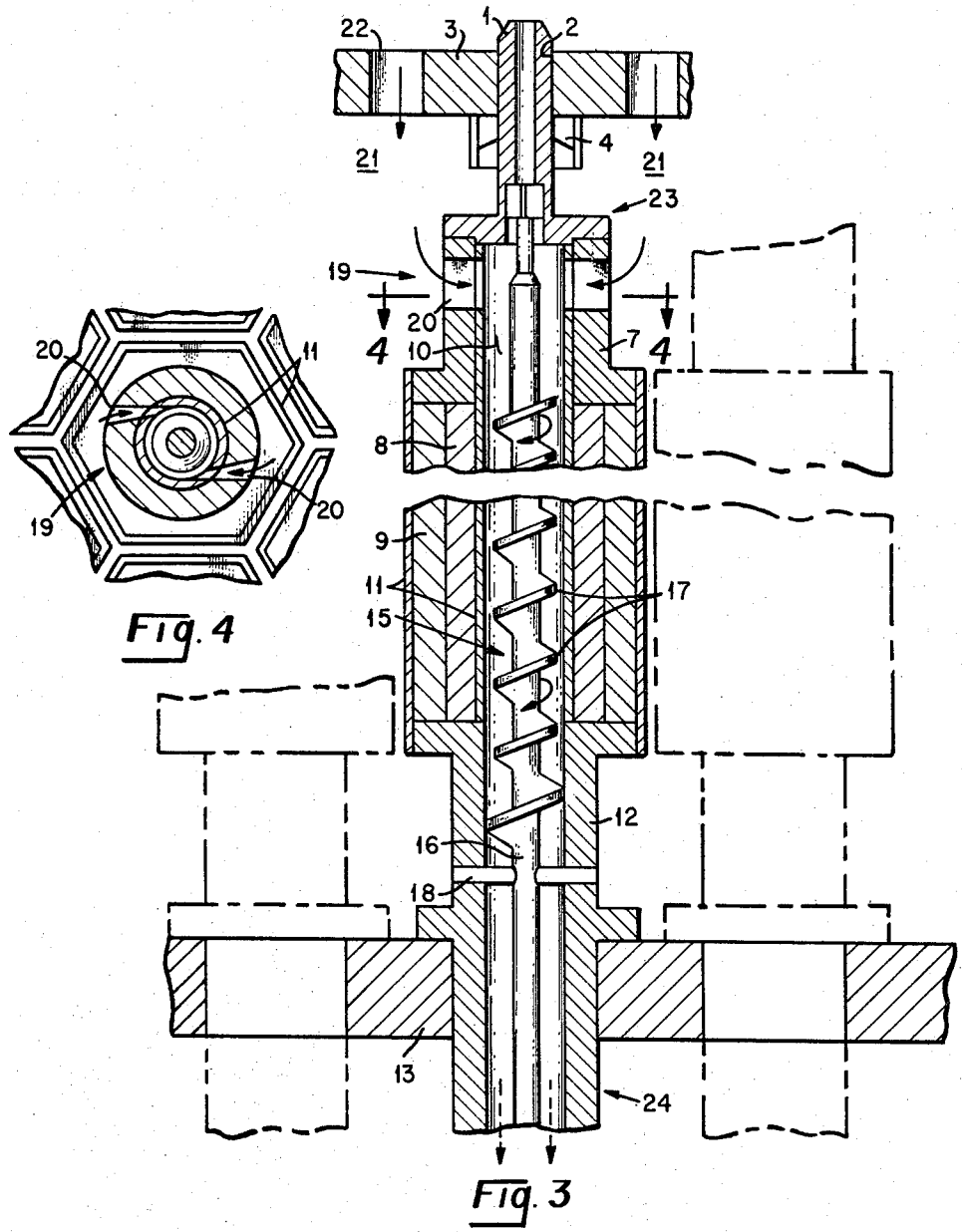
FIG. 3 is a vertical sectional view of a second neutronic fuel element embodiment constructed in accordance with the present invention.
FIG. 4 is a transverse sectional view of the slotted-nozzle tangential-entry prewhirl generator utilized in the fuel element of FIG. 3.

In order to facilitate an understanding of the invention, reference is made to FIGS. 1, 2, and 3 where similar fuel element components are referenced with the same reference numerals. In FIGS. 1 and 2, a first fuel element embodiment is illustrated which uses a downward flow of coolant as illustrated by the arrows. An upper spindle 1 is fitted within an aperture 2 through upper retainer plate 3. As shown, a spring support 4 engages spindle 1 and centers it within aperture 2. The lower end of spindle 1 is provided with a prewhirl generator in the form of a double thread entry screw 5 for imparting vortex flow to liquid coolant entering the fuel element. Cruciform fins 6 support the top end closure and support 7 of the fuel element while permitting passage of liquid coolant into the fuel element through entry screw 5. The active fueled portion of the fuel element comprises a region 8 containing fissionable fuel material and a region 9, disposed concentrically about region 8, containing moderator and/or fertile material. Regions 8 and 9 form an active fuel element portion having a hexagonal outer surface pierced by a centrally located cylindrical coolant passage 10. Cladding 11 forms the wall of coolant passage 10 as well as enclosing the hexagonal outer surface of region 9. A lower fuel element support spindle and closure 12 is disposed at the bottom of the fuel elefent where it acts as a closure, support and positioning member for the fuel element in addition to providing a passageway extension for coolant discharging from the fueled portion of the fuel element. Spindle 12 rests on a lower support plate 13.

A central insert 15, resembling a screw auger, extends downwardly from the top inlet end of the fuel element, immediately below entry screw 5, to a point below the fueled region of the fuel element. Insert 15 comprises a central shank portion 16 disposed coaxially within coolant passage 10, and a helical rib 17 integrally fixed to and encircling shank portion 16. The outside diameter of rib 17 is smaller than the inside diameter of coolant passage 10 so that rib 17 is spaced apart from the wall of coolant passage 10. A spacing of from 0.05 to 0.06 inch has been found satisfactory in a coolant channel having a ¾ inch diameter. Such a spacing facilitates uniform heat transfer in the proximity of the helical rib in comparison with an insert having a rib which contacts the wall, thereby reducing the likelihood of fuel element failure due to temperature induced stress concentrations. A support pin 18 pierces insert 15 and support spindle 12 to provide vertical support to insert 15. The last turn of rib 17, lying below the fueled portion of the fuel element, is of a larger diameter in order to center insert 15 within coolant channel 10.

The fuel element of FIG. 3 differs from that of FIG. 1 only in that a different prewhirl generator is used to impart vortex flow to liquid coolant entering the fuel element. In FIG. 3, a slotted-nozzle tangential-entry prewhirl generator 19 is used rather than the entry screw of FIG. 1. The orientation of slots 20, which are provided directly through the wall of end closure and support 7, is shown in FIG. 4 which is a cross sectional view of prewhirl generator 19.

In operation, pressurized liquid coolant such as water, enters inlet plenum 21 through apertures 22 in upper retainer plate 3. The liquid coolant then passes from inlet plenum 21 into the inlet end 23 of the fuel element. In the fuel element of FIG. 1 the liquid passes through double thread entry screw 5 where an initial vorticity is imparted to it before it begins its trip through coolant passage 10. Vortex flow is provided to liquid coolant entering the fuel element of FIG. 3 by a prewhirl penerator 19 formed by providing tangential inlet slots 20 in end closure 7. The initial vorticity of the liquid coolant, provided by the inlet screw of FIG. 1 and tangential slots of FIG. 3, prevents "burnout" in the initial inlet portion of the coolant channel where steam generation has not yet taken place or is just beginning.

Downstream of the inlet portion of the coolant channel vaporization of the liquid coolant commences. The vaporized coolant separates from the liquid coolant due to the centrifugal action of the vortex flow and passes toward the center of the coolant channel around central insert 15. The vaporized coolant then passes along the spiral flow path defined by helical rib 17 where it accelerates to near sonic velocities due to the continued generation of vaporized coolant which joins in the flow along the length of the coolant passage. The wiping action of the vaporized coolant during its high speed flow causes the liquid coolant to continue the vortex flow initiated by the prewhirl generator. Without this wiping action, the initial vortex flow of the liquid coolant would be dissipated within about the first six inches of the coolant channel immediately below the prewhirl generator.

Although the particular embodiments shown are both vertically oriented and operate using downward coolant flow, it will be apparent to those skilled in the art that horizontal or inclined orientations and upward coolant flow could also be used. For upward flow it is only necessary to move the prewhirl generator to the lower end of the fuel element or simply invert the entire fuel element as illustrated in FIGS. 1 and 3. Inclined orientations may also be used inasmuch as the centrifugal forces of the vortex flow greatly exceed the force of gravity so that the liquid coolant will ride the wall of the coolant tube regardless of its orientation.

The coolant passage length and diameter and the pitch of helical rib 17 are selected in view of the contemplated coolant flow rate and heat flux from fueled region 8 so as to provide for the development of a centrifugal field in the liquid coolant which is adequate to preclude burnout. Preferably, the liquid coolant is present in diminishing quantity up to the exhaust end 24 of the fuel element, at which point virtually all of the coolant has been vaporized. Complete evaporation of the liquid coolant at a point upstream of the exhaust end 24 of the fuel element is generally undesirable as it results in a substantial decrease in heat transfer and an increase in wall temperature along the downstream remainder of the fuel element, where boiling is no longer available as a heat transfer mechanism. It is noted, however, that even where the liquid coolant is completely evaporated, continued vortex flow of the unevaporated coolant through the remaining coolant channel where it passes through a fueled, heat generating fuel element region nevertheless provides some improvement over straight axial flow.

In addition to the very high heat transfer rates which can be achieved without burnout by using the present invention to maintain vortex flow, an additional advantage also is obtained which is very important in neutronic reactors. The additional advantage is that burnout does not occur as quickly in systems using vortex flow even where a burnout heat flux has been reached or exceeded. Thus, a reactor can be operated closer to the critical burnout heat flux without fear that a short transient increase in power which may temporarily exceed the burnout heat flux will cause a fuel element burnout.

Although the present fuel elements may be generally used in reactors where liquid coolant is vaporized, they are particularly useful in the boiling, recirculating water reactors described in U.S. Patents No. 3,290,221 and No. 3,287,228 of common assignee.

FIG. 5 illustrates experimental results obtained using a downflow vortex test assembly having a prewhirl generator and a central insert similar to those of FIG. 1, but using electrical resistance heaters as a heat source in place of nuclear fuel. Curves A, B, C, and D were obtained at steam discharge pressures of 600, 500, 400, and 300 p.s.i.g., respectively, and with pressure drops through the test assembly from about 20 to 30 p.s.i. Dashed lines E, F, and G represent constant steam qualities of 100, 75, and 50 percent, respectively at 600 p.s.i.g., the steam discharge pressure of curve A. The relatively high quality (80–90 percent) of the steam produced by the vortex test assembly at 600 p.s.i.g. steam discharge pressure and heat fluxes in excess of $2 \times 10^6$ B.t.u./hr.-ft.$^2$ becomes apparent from examination of curve A and the constant quality lines of FIG. 5. Although, for simplicity, constant quality lines are not shown in FIG. 5 for the lower pressures of curves B, C, and D, intermediate quality steam was produced at those pressures for heat fluxes in excess of $2 \times 10^6$ B.t.u./hr.-ft.$^2$. The specifications of the test equipment utilized in generating the curves of FIG. 5 are as follows:

Coolant channel:
    Inside diameter _____inches__ 0.742
    Active heat transfer length _____do___ 14.62
    Material _____ 304 stainless steel
Entry screw (double thread):
    Pitch _____inches__ 0.2
    Material _____ Brass
Central insert:
    Diameter of shank portion _____inches__ 0.25
    Outside diameter of helical rib _____do___ 0.625
    Pitch of helical rib _____do___ 1.00
    Material _____ Fe-Cr-Y-Al alloy
Coolant _____ Water Although heat fluxes in the order of $1 \times 10^6$ B.t.u./hr.-ft.$^2$ have been achieved using non-vortex flow, only very low quality steam (10–15 percent) was produced. The present system, on the other hand, has achieved heat fluxes in excess of $2 \times 10^6$ B.t.u./hr.-ft.$^2$ while producing high quality steam (80–90 percent) and requiring only very small pressure drops (10–20 p.s.i.).

The above description of the invention was offered for illustrative purposes only, and should not be interpreted in a limiting sense. It is intended rather that the invention be limited only by the claims appended hereto.

What is claimed is:

1. Apparatus for increasing the burnout heat flux in a heat exchange tube wherein liquid coolant is passed through a cylindrical coolant channel and vaporized in a heat transfer region of said coolant channel, comprising: a coolant channel, liquid coolant entering one end of said coolant channel, an elongated insert disposed coaxially within said coolant channel and extending along the length thereof, said insert comprising a substantially cylindrical shank portion and a helical rib spiraling around said shank portion, the radial periphery of said helical rib being spaced apart from the wall of said coolant channel in said heat transfer region, and means for imparting an initial vortex flow to liquid coolant entering said coolant channel, said liquid coolant being maintained in vortex flow along the length of said coolant channel by the action of vaporized coolant as it travels along the spiral path defined by said helical rib and shank portion of said central insert.

2. In a neutronic reactor fuel element wherein liquid coolant is passed through a cylindrical coolant channel where it is vaporized, and wherein said coolant channel is surrounded by heat generating fissionable fuel material defining a heat transfer region, the improvement comprising an elongated insert disposed coaxially within said coolant channel and extending along the length thereof, said insert comprising a substantially cylindrical shank portion and a helical rib spiraling around said shank portion, the radial periphery of said helical rib being spaced apart from the wall of said coolant channel in said heat transfer region, and means for imparting an initial vortex flow to liquid coolant entering said coolant channel, said liquid coolant being maintained in vortex flow along the length of said coolant channel by the action of vaporized coolant as it travels along the spiral path defined by said helical rib and shank portion of said central insert.

3. The improvement of claim 1 wherein said means for imparting an initial vortex flow to liquid coolant entering said coolant channel comprises an entry screw having a generally cylindrical shank portion and at least one helical rib spiraling around said shank portion, said helical rib having a radial periphery whose diameter is substantially equal to the inside diameter of said coolant channel, said entry screw imparting a centrifugal acceleration to the liquid coolant at the coolant channel wall of at least 250 g.

4. The improvement of claim 1 wherein said means for imparting an initial vortex flow comprises at least one tangential inlet slot provided at the inlet end of said coolant channel, said inlet slot imparting a centrifugal acceleration to the liquid coolant of at least 250 g. at the coolant channel wall.

5. The improvement of claim 1 wherein said liquid coolant is water.

6. The improvement of claim 1 wherein said coolant channel is vertically oriented and said liquid coolant enters said coolant channel at its upper end.

References Cited

UNITED STATES PATENTS

| | | | |
|---|---|---|---|
| 3,072,555 | 1/1963 | Barth et al. | 176—54 |
| 3,016,067 | 1/1962 | Edmonds | 138—38 |
| 3,132,998 | 5/1964 | Long et al. | 176—50 X |
| 3,156,626 | 11/1964 | Huet | 176—54 |

FOREIGN PATENTS

| | | |
|---|---|---|
| 1,167,056 | 7/1958 | France. |
| 1,365 | 1868 | Great Britain. |
| 17,259 | 1894 | Great Britain. |

ROBERT A. O'LEARY, *Primary Examiner.*

A. W. DAVIS, JR., *Assistant Examiner.*